May 1, 1934.                H. T. WHEELER                1,956,844
                           FLUXION SEAL RING
                           Filed May 4, 1931

INVENTOR.

Harley T. Wheeler

Patented May 1, 1934

1,956,844

UNITED STATES PATENT OFFICE 1,956,844

FLUXION SEAL RING

Harley T. Wheeler, Dallas, Tex.

Application May 4, 1931, Serial No. 534,898

2 Claims. (Cl. 286—7)

This invention relates to the fluxion seal ring, the chief advantage of which lies in its capability of inducing a circulation thru the packing by utilizing the normal vibrational movements of the shaft.

Another advantage is that no more pressure is used against the packing than is necessary to effect a seal.

One other advantage is that a slight tension is available to prevent leakage when the pump shaft is idle.

Still another and important advantage is a hydraulic pump action which circulates the liquid medium thru the packing and keeps the latter cool.

With these objects and advantages in view, other desirable features of construction and operation will be brought out as the description proceeds, accompanied by the drawing, wherein.

Figure 1:
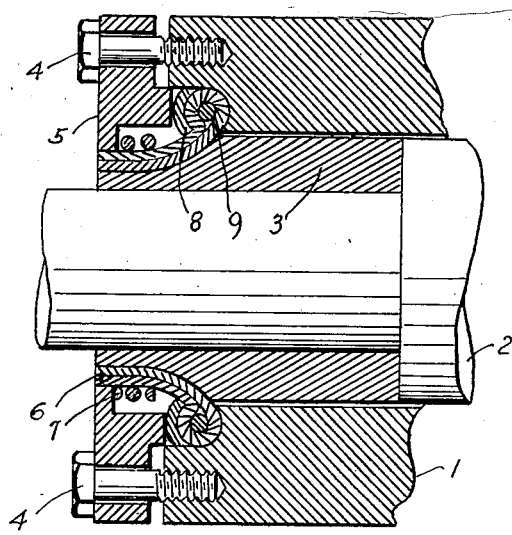
Figure 1 is a cross-section of a stuffing-box built according to this invention, showing the position of the packing ring and the contributory parts.

Referring now to Figure 1, the cross-section of a specially constructed stuffing-box and a rotary shaft sleeve is shown, in which the frame 1 is the pump housing thru which the shaft 2 extends, there being a clearance to prevent contact. On the shaft 2 is mounted a sleeve 3, having a sloping shoulder at the outer portion which fits the cone-shaped depression of the packing ring 6. The packing ring 6 has an inside surface of a cone-shaped depression terminating in a tubular shape at its outer extremity. The outer surface of the ring is concentric with the inner surface. The material of the ring is porous and suitable for contact friction.

At the large diameter of the ring 6, the packing material is formed into a roll which fits into a curved portion of the frame 1. A clamping ring 8 depresses the roll of the packing 6 into a socket cut in the main frame 1. The clamping ring in turn is held in place by the packing ring 5, the latter being adjusted by the cap screws 4, 4. A helical spring 7, made slightly smaller than the trunk of the packing ring 6, holds the latter around the sleeve 3 with a slight tension.

Figure 2:
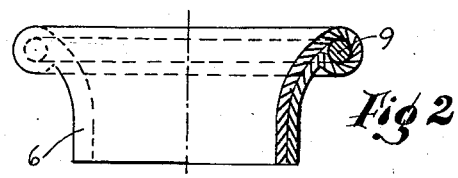
Figure 2 is a partial cross-section of the packing ring used to effect the result claimed in this invention.

In Figure 2 is shown a partial cross-section of the packing ring 6, being in this description formed of a thin annular ring of porous flexible material, preferably of woven asbestos formed to shape in a mould around the ring 9. As the ring may be efficiently made in a variety of ways, it is not the purpose of this specification to disclose the method of manufacture.

Figure 3:
Figure 3 is a partial cross-section of the clamp ring.

Figure 3 is a partial cross-section of the clamping ring 8 which is made of a suitable thin metal, to fit the roll of the packing ring 6.

Figure 4:
Figure 4 is a partial cross-section of the helical tension spring.

Figure 4 is a partial cross-section of the helical spring 7, which is of such a diameter as to produce a required tension around the trunk of the packing ring 6.

Referring now to my application for Letters Patent, Serial Number 526,288, dated March 30, 1931, and directing attention to Figure 19 and the subject matter from lines 10 to 22 inclusive, it is stated that the effect of vibration on a porous type of packing is to open and close the pores and so produce a pumping action which increases circulation thru the packing by raising the internal pressure within the porous structure. In the example quoted the effect of vibration is cited as damaging, as it quickly exhausts the oil of impregnation and hastens leakage with an increased friction. Also in the example quoted there is a high pressure differential between the source of the pressure and the outside of the packing.

In this application for Letters Patent the reverse condition, a very low differential of pressure, is being considered. Practice demonstrates that a rotating shaft having a liquid in the pump chamber at a pressure very nearly that which exists at the outside of the packing, does not have enough pressure available to maintain a proper circulation thru the packing to keep it cool and to establish a film around the shaft. To obtain the required circulation various methods have been adopted to pipe pressure into the center of the packing at a gland, thereby creating a pressure differential across the packing rings. But this means a consequent reaction by the packing against the shaft far in excess of the actual pressure being packed, resulting in excess friction and inevitable cutting of the shaft.

If the difference of the pressures between the pump chamber and the outside of the packing is very small, either a few pounds pressure or a few inches of vacuum, it should be easily seen that all that is needed is a seal in the form of a film of liquid between the packing and the shaft. However, if ordinary braided packing or a moulded type of packing is to be used, a considerable pressure differential is necessary to establish a flow thru the structure to overcome the resistance of the pores to the pressure.

Figure 5:
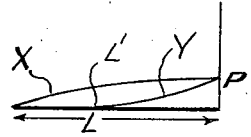
Figure 5 is an internal-pressure diagram of the operating conditions of the packing.

Returning now to Figure 1, the packing ring 6 is composed of a porous material formed to the funnel-shape shown and a rigid point created at the roll around the ring 9. The roll of the ring is then fixed to the frame 1 by means of the clamping ring 8 and the adjustment of the packing gland 5. The funnel shape of the packing ring terminates in a tubular section which is flexible to radial vibration, yet has a surface concentric with the sleeve 3 so that lateral motion is possible without seriously cramping the packing ring. A slight tension is put on the tubular section of the packing ring 6 by the helical spring 7. Without any action to induce circulation, the available pressure in the pump chamber would not penetrate the pores of the packing ring 6, and the condition of internal pressure would be that expressed in Figure 5 by the line Y, the impressed pressure P being reduced by frictional resistance during passage thru the pores so that it becomes equal to the pressure on the outside at point L', before the entire length of the packing contact, L, is traversed. This is the condition that obtains while the shaft is idle, the spring 7 closing off all avenues of circulation.

During rotation, a different condition arises; there is always a slight end motion of a rotary shaft due to the clearance in the thrust bearing. There will also exist a radial vibration in the shaft due to slight lack of balance of the rotating element. The sloping shoulder on the sleeve 3, which fits the cone-shaped depression of the packing ring 6, is constantly moving laterally with respect to the packing ring fixed to the frame 1. Any liquid which enters the fit between the packing ring 6 and the sloping shoulder of the sleeve 3 during a lateral motion which opens the fit, will be compressed on the reverse lateral motion as the fit is closed, and the easiest path of escape is thru the pores of the packing ring, and toward the outside surface of the ring or toward its outside end.

It may also be seen that the roll of the packing ring 6 is clamped to the frame 1 and that during radial vibration the throat of the packing ring will be constantly in flexure. During each revolution of the shaft 2, the vibration will move the trunk of the packing ring and the pores will be opened and closed periodically. Any liquid which has been pumped into the pores by the lateral motion of the shaft 2, will again be pumped by the movement due to vibration of the shaft toward the outside surfaces of the porous packing ring 6. This condition of internal pressure is indicated by the curve X of Figure 5, the rise of pressure having been secured by the expenditure of energy in opening and closing the pores of the packing ring.

It is submitted that this is a new type of seal for a rotary shaft which will use the minimum of power and produce no cutting of the sleeves, because the result is a film of liquid between the shaft and the entire length of the packing contact. It is induced circulation without the former disadvantages of using a high pressure differential to penetrate a denser packing.

It should also be obvious that the roll of the packing ring can be attached to the moving element, or that the packing ring can be reversed in position to reverse the flow of liquid. Also that the same ring may be used on gases if a liquid is injected to form the necessary seal.

It should also be seen, that there are always two available paths for the liquid to escape after it has been pumped by the motion of vibration: thru the porous fabric, and along the shoulder fitting the packing. If the pores should become clogged by foreign matter, the packing will continue to operate by pumping the liquid along the shaft. From this latter fact, it may also be seen that a ring may be used which is not porous, so long as the tubular section is flexible. Again it may be seen, that either a cone-shaped or a hyperbolically-shaped contact surface will serve approximately the same purpose in pumping the liquid, and that the hyperbolic surface is to be preferred.

Many other combinations may be effected to secure the advantages of an induced internal-pressure, but such applications of the idea as are included under the following claims, I do affirm are subject to this application for Letters Patent.

I claim:

1. A packing for shafts and the like, including an annular housing, a member rotatable in said housing and having a hyperbolically tapered shoulder terminating in a cylindrical portion, a packing sleeve of porous flexible material shaped to fit against said shoulder and about the cylindrical end of said member, the inner end of said sleeve fitting within a recess in said housing, and a gland on said housing securing said sleeve to said housing and fitting about the cylindrical portion of said sleeve.

2. In a stuffing box around a rotatable shaft, a stationary housing, a member rotatable therein, a tapered shoulder on said member terminating in an approximately cylindrical end, a sleeve of porous flexible material, a ring at the inner larger end thereof, the body of said sleeve conforming to the shape and fitting closely against said rotatable member, a gland securing said larger end to said housing and also engaging about the outer end thereof, and a spring assisting in retaining said packing sleeve tightly against said tapered shoulder.

HARLEY T. WHEELER.